(12) United States Patent
Wang et al.

(10) Patent No.: US 9,869,769 B2
(45) Date of Patent: *Jan. 16, 2018

(54) GPS POSITIONING METHOD FOR MOBILE TERMINAL, AND MOBILE TERMINAL

(71) Applicant: Huawei Device (Dongguan) Co., Ltd., Dongguan (CN)

(72) Inventors: Tongbo Wang, Shanghai (CN); Wenfeng Yao, Shenzhen (CN); Gaopeng Li, Shenzhen (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/335,095

(22) Filed: Oct. 26, 2016

(65) Prior Publication Data

US 2017/0045620 A1    Feb. 16, 2017

Related U.S. Application Data

(63) Continuation of application No. 14/569,486, filed on Dec. 12, 2014, now Pat. No. 9,507,025, which is a (Continued)

(30) Foreign Application Priority Data

Jan. 24, 2013  (CN) .......................... 2013 1 0027716

(51) Int. Cl.
*G01S 19/06* (2010.01)
*G01S 19/13* (2010.01)
(Continued)

(52) U.S. Cl.
CPC .............. *G01S 19/06* (2013.01); *G01S 19/13* (2013.01); *G01S 19/25* (2013.01); *G01S 19/252* (2013.01);
(Continued)

(58) Field of Classification Search
CPC ................................ G01S 19/13; G01C 21/00
(Continued)

(56) References Cited

U.S. PATENT DOCUMENTS 6,437,735 B1    8/2002  McMahan
6,937,865 B1    8/2005  Bloebaum et al.
(Continued)

FOREIGN PATENT DOCUMENTS

CN              1589059 A       3/2005
CN            101398477 A       4/2009
(Continued)

*Primary Examiner* — Dao Phan
(74) *Attorney, Agent, or Firm* — Slater Matsil, LLP

(57) ABSTRACT

A GPS positioning method for a mobile terminal, and a mobile terminal are provided. The method includes: after GPS positioning is started, acquiring a first cell identifier of a first cell in which the mobile terminal is located; acquiring, according to the first cell identifier, first latitude and longitude information corresponding to the first cell identifier from a correspondence table stored on the mobile terminal, where the correspondence table includes a cell identifier and latitude and longitude information corresponding to the cell identifier; and with reference to the first latitude and longitude information, and time information and ephemeris information that are acquired in advance, performing GPS positioning on the mobile terminal by using a GPS receiver of the mobile terminal.

20 Claims, 4 Drawing Sheets

Related U.S. Application Data continuation of application No. PCT/CN2014/070716, filed on Jan. 16, 2014.

(51) Int. Cl.
   *G01S 19/31* (2010.01)
   *H04W 4/02* (2009.01)
   *H04W 64/00* (2009.01)
   *G01S 19/25* (2010.01)

(52) U.S. Cl.
   CPC ............. *H04W 4/02* (2013.01); *H04W 64/00* (2013.01); *H04W 4/027* (2013.01)

(58) Field of Classification Search
   USPC .............. 342/357.2, 357.25, 357.43, 357.51, 342/357.71; 701/468, 469
   See application file for complete search history.

(56) References Cited

U.S. PATENT DOCUMENTS

| | | |
|---|---|---|
| 7,233,798 B2 | 6/2007 | Drawert et al. |
| 8,145,234 B1 | 3/2012 | Leonard |
| 8,412,233 B2 | 4/2013 | Yang |
| 9,507,025 B2 * | 11/2016 | Wang ..................... G01S 19/06 |
| 2002/0080063 A1 | 6/2002 | Bloebaum et al. |
| 2004/0203915 A1 | 10/2004 | van Diggelen et al. |
| 2006/0129317 A1 | 6/2006 | Farmer et al. |
| 2009/0085801 A1 | 4/2009 | Sengupta et al. |
| 2010/0321236 A1 | 12/2010 | Diggelen et al. |
| 2012/0077487 A1 | 3/2012 | Yang |
| 2012/0268322 A1 | 10/2012 | Takahashi |
| 2012/0274510 A1 | 11/2012 | Lee et al. |

FOREIGN PATENT DOCUMENTS

| | | |
|---|---|---|
| CN | 101600149 A | 12/2009 |
| CN | 102472819 A | 5/2012 |
| CN | 102761962 A | 10/2012 |
| JP | 2011038973 A | 2/2011 |
| WO | 2010139153 A1 | 12/2010 |

* cited by examiner

GPS POSITIONING METHOD FOR MOBILE TERMINAL, AND MOBILE TERMINAL

CROSS-REFERENCE TO RELATED APPLICATIONS

This application is a continuation of U.S. patent application Ser. No. 14/569,486, filed on Dec. 12, 2014, which is a continuation of International Application No. PCT/CN2014/070716, filed on Jan. 16, 2014. The International Application claims priority to Chinese Patent Application No. 201310027716.6, filed on Jan. 24, 2013. All of the aforementioned patent applications are hereby incorporated by reference in their entireties.

TECHNICAL FIELD

Embodiments of the present invention relate to the field of electronic communications, and in particular, to a GPS positioning method for a mobile terminal, and a mobile terminal.

BACKGROUND

With the popularization of smartphones, location based services (LBS) are increasingly concerned, and a requirement of a user on global positioning system (GPS) experience is increasingly high. A GPS positioning speed is a key factor affecting user experience.

An assisted GPS (AGPS, network assisted GPS) positioning technology integrates advantages of GPS positioning and cellular base station positioning. When a mobile terminal performs GPS positioning by using the AGPS positioning technology, the mobile terminal can acquire, from a cellular network, auxiliary information required during the GPS positioning, for example, information about a satellite frequency band available in a current region, a position, an elevation angle, and the like, so that a full-band and large-scale search is avoided, thereby greatly increasing a first-time satellite searching speed. Therefore, the AGPS positioning technology, by virtue of a data transmission function of the cellular network, can increase a positioning speed and improve positioning precision.

However, the AGPS positioning technology is implemented only by performing multiple times of data transmission through a network, and has a relatively high requirement on network signal quality, and when the network signal quality is poor, an AGPS positioning speed is significantly affected.

SUMMARY

Embodiments of the present invention provide a GPS positioning method for a mobile terminal, and a mobile terminal, so as to increase a GPS positioning speed.

According to a first aspect, a GPS positioning method for a mobile terminal includes acquiring a first cell identifier of a first cell in which the mobile terminal is located after GPS positioning is started. The method includes acquiring, according to the first cell identifier, first latitude and longitude information corresponding to the first cell identifier from a correspondence table stored on the mobile terminal. The correspondence table includes a cell identifier and latitude and longitude information corresponding to the cell identifier. Using the first latitude and longitude information, along with a time information and an ephemeris information that are acquired in advance, performing GPS positioning on the mobile terminal by using a GPS receiver of the mobile terminal.

In a first possible implementation manner of the first aspect, the method further includes: acquiring the time information before the GPS positioning is started, where the time information is current time. The acquiring the time information includes acquiring the time information from a system message or acquiring the time information from a network side.

With reference to the first aspect, or the first possible implementation manner of the first aspect, in a second possible implementation manner, the method further includes acquiring the ephemeris information before the GPS positioning is started. The ephemeris information is acquired in the following manner. The current ephemeris information is acquired from a network side according to a preset time interval. The current ephemeris information is generated through calculation according to ephemeris information acquired after previous GPS positioning.

With reference to the first aspect, or the first possible implementation manner of the first aspect, or the second possible implementation manner of the first aspect, in a third possible implementation manner, the method further includes acquiring the first cell identifier and the first latitude and longitude information corresponding to the first cell identifier before the GPS positioning is started. The method further includes adding the first cell identifier and the first latitude and longitude information corresponding to the first cell identifier to the correspondence table. The acquiring the first latitude and longitude information corresponding to the first cell identifier includes acquiring the first latitude and longitude information corresponding to the first cell identifier from a network side when the mobile terminal enters the first cell or when the mobile terminal enables a data service within the first cell. Alternatively, the acquires includes acquiring the first latitude and longitude information corresponding to the first cell identifier from a system message when the mobile terminal enters the first cell or when the mobile terminal enables a data service within the first cell. Alternatively, during a process of performing GPS navigation by the mobile terminal, acquiring the first latitude and longitude information corresponding to the first cell identifier from GPS navigation data when the mobile terminal passes through the first cell.

With reference to the first aspect, or the first possible implementation manner of the first aspect, or the second possible implementation manner of the first aspect, or the third possible implementation manner of the first aspect, in a fourth possible implementation manner, the method further includes updating the first latitude and longitude information corresponding to the first cell identifier in the correspondence table with latitude and longitude information acquired in the GPS positioning after the GPS positioning is performed.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the method further includes acquiring frequency of GPS positioning performed in each cell by the mobile terminal, maintaining, according to the frequency of the GPS positioning, latitude and longitude information of N cells with highest frequency in the correspondence table.

According to a second aspect, a mobile terminal includes an identifier acquiring module configured to acquire, after GPS positioning is started, a first cell identifier of a first cell in which the mobile terminal is located. A location acquiring module is configured to acquire, according to the first cell identifier acquired by the identifier acquiring module, first latitude and longitude information corresponding to the first cell identifier from a correspondence table stored on the mobile terminal. The correspondence table includes a cell identifier and latitude and longitude information corresponding to the cell identifier. A GPS receiver module is configured to perform GPS positioning on the mobile terminal with reference to the first latitude and longitude information acquired by the location acquiring module, and time information and ephemeris information that are acquired in advance.

In a first possible implementation manner of the second aspect, the mobile terminal further includes a time acquiring module, which is configured to acquire the time information before the GPS positioning is started, where the time information is current time. The time acquiring module is specifically configured to: acquire the time information from a system message before the GPS positioning is started; or acquire the time information from a network side before the GPS positioning is started.

With reference to the second aspect, or the first possible implementation manner of the second aspect, in a second possible implementation manner, the mobile terminal further includes an ephemeris acquiring module, which is configured to: acquire the ephemeris information before the GPS positioning is started. The ephemeris acquiring module is specifically configured to acquire current ephemeris information from a network side according to a preset time interval before the GPS positioning is started. Before the GPS positioning is started, the ephemeris acquiring module is specifically configured to generate current ephemeris information through calculation according to ephemeris information acquired after previous GPS positioning.

With reference to the second aspect, or the first possible implementation manner of the second aspect, or the second possible implementation manner of the second aspect, in a third possible implementation manner, the mobile terminal further includes: a relationship table acquiring module, which is configured to: before the GPS positioning is started, acquire the first cell identifier and the first latitude and longitude information corresponding to the first cell identifier, and add the first cell identifier and the first latitude and longitude information corresponding to the first cell identifier to the correspondence table. The relationship table acquiring module includes a first acquiring unit, a second acquiring unit, and an adding unit. The first acquiring unit is configured to acquire the first cell identifier. The second acquiring unit is configured to acquire the first latitude and longitude information corresponding to the first cell identifier from a network side when the mobile terminal enters the first cell or when the mobile terminal enables a data service within the first cell.

The second acquiring unit is configured to: when the mobile terminal enters the first cell or when the mobile terminal enables a data service within the first cell, acquire the first latitude and longitude information corresponding to the first cell identifier from a system message. The second acquiring unit is configured to: during a process of performing GPS navigation by the mobile terminal, when the mobile terminal passes through the first cell, acquire the first latitude and longitude information corresponding to the first cell identifier from GPS navigation data. The adding unit is configured to add the first cell identifier acquired by the first acquiring unit and the first latitude and longitude information acquired by the second acquiring unit to the correspondence table.

With reference to the second aspect, or the first possible implementation manner of the second aspect, or the second possible implementation manner of the second aspect, or the third possible implementation manner of the second aspect, in a fourth possible implementation manner, the mobile terminal further includes a location updating module configured to update the first latitude and longitude information corresponding to the first cell identifier in the correspondence table with latitude and longitude information acquired in the GPS positioning after the GPS positioning is performed.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the mobile terminal further includes a frequency acquiring module configured to acquire frequency of GPS positioning performed in each cell by the mobile terminal. A relationship table maintaining module is configured to maintain, according to the frequency of the GPS positioning acquired by the frequency acquiring module, latitude and longitude information corresponding to N cells with highest frequency in the correspondence table.

According to the embodiments of the present invention, when a mobile terminal performs GPS positioning, latitude and longitude information corresponding to a cell in which the mobile terminal is currently located is acquired from a correspondence table stored on the mobile terminal, and a speed at which a GPS receiver performs the GPS positioning may be increased according to the latitude and longitude information, and time information and ephemeris information that are obtained in advance. Because the latitude and longitude information does not need to be acquired by using a network side, times of data transmission between the mobile terminal and the network side may be reduced, and a positioning speed is increased; and an impact of network signal quality on an AGPS positioning speed is reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The ordinal numbers such as "first" and "second" mentioned in the embodiments of the present invention shall only serve a purpose of differentiation unless the numbers definitely indicate a sequence according to the context.

Figure 1:
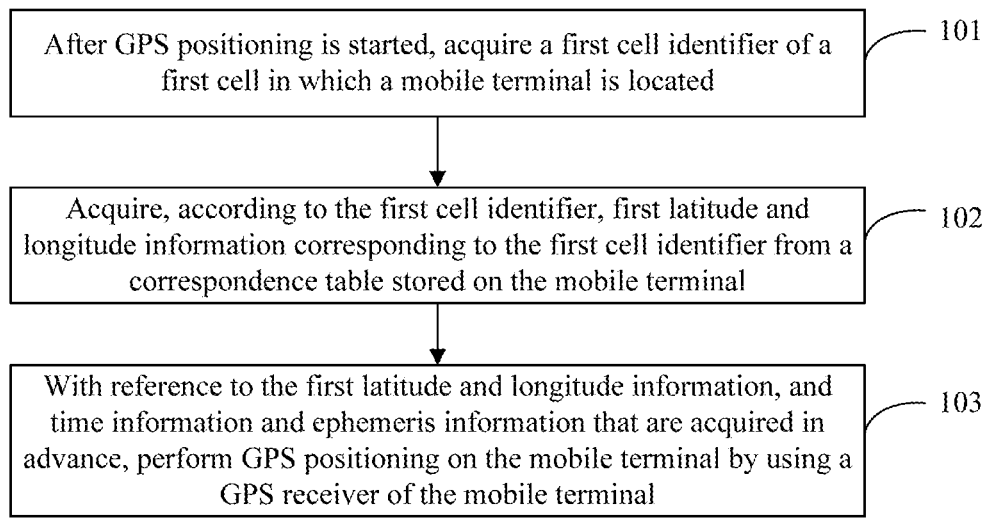
FIG. 1 is a flowchart of a GPS positioning method for a mobile terminal according to an embodiment of the present invention.

FIG. 1 is a flowchart of a GPS positioning method for a mobile terminal according to an embodiment of the present invention. As shown in FIG. 1, the method includes the following steps.

Step 101: After GPS positioning is started, a first cell identifier of a first cell in which a mobile terminal is located is acquired. This refers to time after the terminal starts executing GPS positioning. In other words, acquiring a first cell ID is started after GPS positioning is started.

The mobile terminal in the embodiment of the present invention has a GPS positioning function. The mobile terminal may be, but is not limited to, for example, a mobile phone, a tablet computer, a laptop, an ultra-mobile personal computer (UMPC), a netbook, a personal digital assistant (PDA), or a point of sales (POS).

After the mobile terminal starts the GPS positioning, the mobile terminal acquires a cell identifier of a current cell in which the mobile terminal is located, where the cell identifier may be a cell identity (cell ID). A base station covers one cell or more cells.

The mobile terminal may use the prior art to acquire the cell identity of the current cell. For example, the mobile terminal may acquire the cell identity in any one of the following scenarios: (1) cell routing and paging, (2) positioning area updating, (3) cell updating, and (4) routing area updating.

The mobile terminal may store the cell identity after acquiring the cell identity of the current cell, so that after the GPS positioning is started, the mobile terminal may acquire the cell identity from a storage area.

The foregoing first cell is the cell in which the mobile terminal is currently located, and the first cell identifier may be the cell identity of the currently located cell.

Step 102: Acquire, according to the first cell identifier, first latitude and longitude information corresponding to the first cell identifier from a correspondence table stored on the mobile terminal, where the correspondence table includes a cell identifier and latitude and longitude information corresponding to the cell identifier.

The mobile terminal may acquire and store the correspondence table in advance, and at least one cell identifier and latitude and longitude information corresponding to the at least one cell identifier are stored in the correspondence table. The mobile terminal may maintain and update the correspondence table. For example, when obtaining latitude and longitude information corresponding to a new cell identifier, the mobile terminal may add the new cell identifier and the latitude and longitude information corresponding to the new cell identifier to the correspondence table.

Step 103: With reference to the first latitude and longitude information, and time information and ephemeris information that are acquired in advance, perform GPS positioning on the mobile terminal by using a GPS receiver of the mobile terminal.

The GPS receiver of the mobile terminal may perform the GPS positioning on the mobile terminal by using a GPS satellite. When obtaining in advance the first latitude and longitude information, the time information, and the ephemeris information, the GPS receiver may search for a visible satellite on a small scale, so that a speed at which the GPS receiver finds the visible satellite is increased. Because the first latitude and longitude information is stored within the mobile terminal and does not need to be acquired through a network, times of data transmission performed, in the AGPS positioning technology, between the mobile terminal and a server on a network side may be reduced, and a positioning speed may be increased.

The time information and the ephemeris information may be obtained before the mobile terminal performs the GPS positioning. The time information is current time, may be obtained from a server on the network side, or may be obtained from a system message. The ephemeris information may be acquired from the network side, or may be obtained, through calculation, by the mobile terminal according to previous GPS positioning.

According to the embodiment of the present invention, when a mobile terminal performs GPS positioning, latitude and longitude information corresponding to a cell in which the mobile terminal is currently located is acquired from a correspondence table stored on the mobile terminal, and a speed at which a GPS receiver performs the GPS positioning may be increased according to the latitude and longitude information, and time information and ephemeris information that are obtained in advance. Because the latitude and longitude information does not need to be acquired by using a network side, times of data transmission between the mobile terminal and the network side may be reduced, and a positioning speed is increased; and an impact of network signal quality on an AGPS positioning speed is reduced.

Figure 2:
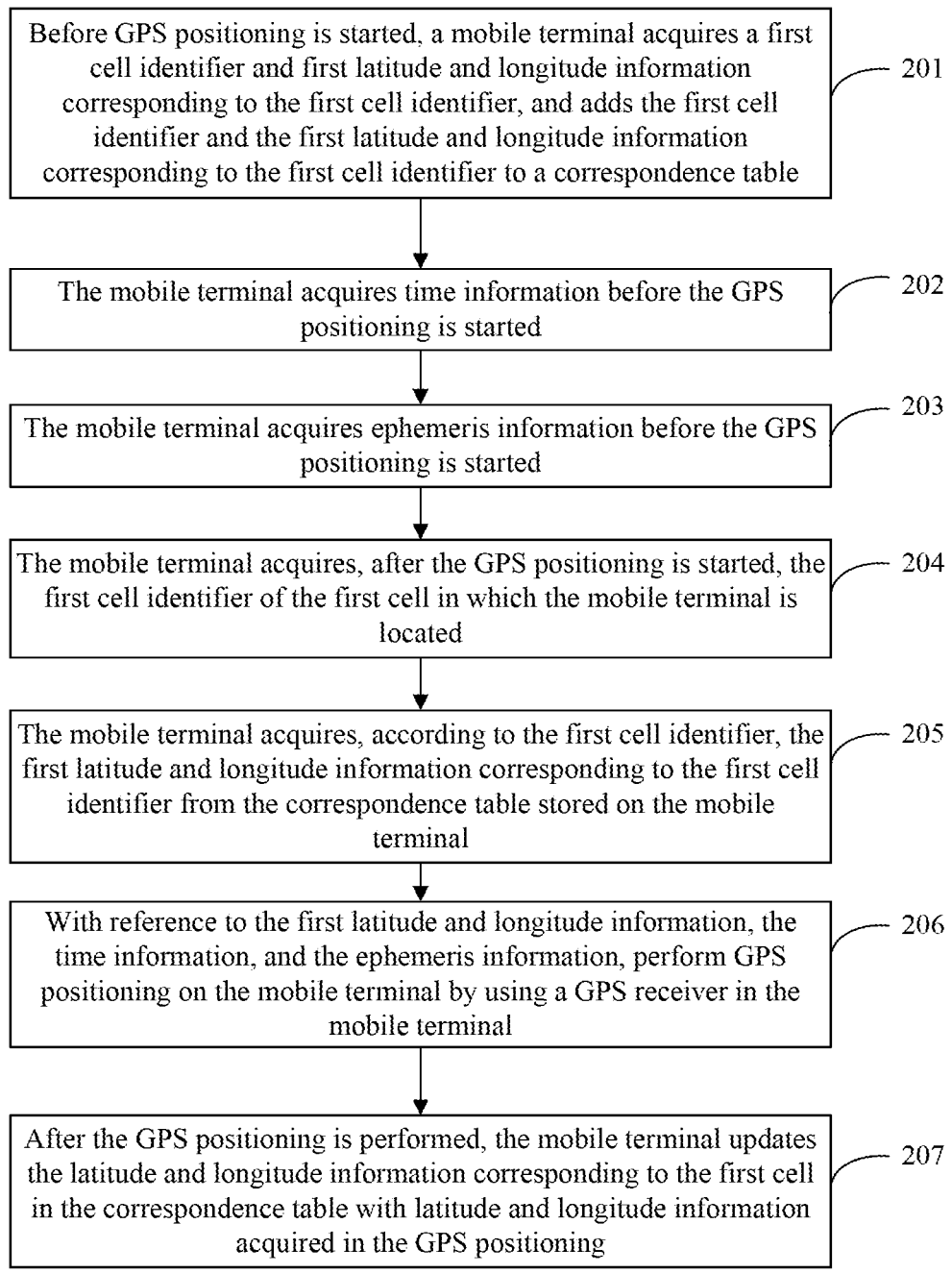
FIG. 2 is a flowchart of another GPS positioning method for a mobile terminal according to an embodiment of the present invention.

FIG. 2 is a flowchart of another GPS positioning method for a mobile terminal according to an embodiment of the present invention. Based on the embodiment shown in FIG. 1, as shown in FIG. 2, the method includes the following steps.

Step 201: Before GPS positioning is started, a mobile terminal acquires a first cell identifier and first latitude and longitude information corresponding to the first cell identifier, and adds the first cell identifier and the first latitude and longitude information corresponding to the first cell identifier to a correspondence table.

The mobile terminal may acquire the first latitude and longitude information corresponding to the first cell identifier in any one of the following manners:

(1) When the mobile terminal enters a first cell or when the mobile terminal enables a data service within the first cell, the first latitude and longitude information corresponding to the first cell identifier is acquired from a network side.

An AGPS location server or another server on the network side can store latitude and longitude information corresponding to cell identifiers, and when the mobile terminal first enters a cell or when the mobile terminal first enables a data service within a cell, the mobile terminal may request latitude and longitude information corresponding to the cell from a network side, or the network side may actively send the latitude and longitude information corresponding to the cell to the mobile terminal.

(2) When the mobile terminal enters a first cell or when the mobile terminal enables the data service within the first cell, the first latitude and longitude information corresponding to the first cell identifier is acquired from a system message.

For a code division multiple access (CDMA) standard, a mobile phone system message includes latitude and longitude information of a current cell, so that the mobile terminal may directly acquire the latitude and longitude information of the current cell from the mobile phone system message; however, in a universal mobile telecommunications system (UMTS) standard or a long term evolution (LTE) standard, with the improvement of a database of an operator, the latitude and longitude information of the current cell may also be obtained by the mobile terminal from the system message.

(3) During a process of performing GPS navigation by the mobile terminal, when the mobile terminal passes through a first cell, the first latitude and longitude information corresponding to the first cell identifier is acquired from GPS navigation data.

During the process of performing GPS navigation by the mobile terminal, the mobile terminal may pass through a plurality of cells, and the GPS navigation data includes latitude and longitude information of location points at which the mobile terminal moves during the navigation process, so latitude and longitude information of each cell may be acquired from the GPS navigation data.

Step 202: The mobile terminal acquires time information before the GPS positioning is started, where the time information is current time.

Specifically, the mobile terminal may acquire the time information from the system message; or may acquire the time information from the network side. The time information is accurate current time. In the CDMA standard, system time of the mobile terminal is accurate time, so the time information may be acquired from the system message; and in another standard, current accurate time may be acquired from a server (for example, a time server) on the network side. Therefore, in the CDMA standard, the mobile terminal may acquire the time information from the system message after the GPS positioning is started and does not need to acquire the time information in advance. The time information in the embodiment of the present invention may be universal time coordinated (UTC), also called coordinated universal time.

Step 203: The mobile terminal acquires ephemeris information before the GPS positioning is started.

Specifically, the mobile terminal may acquire current ephemeris information from the network side according to a preset time interval, that is, the mobile terminal may acquire the current ephemeris information from the network side for multiple times at regular or irregular intervals, where the current ephemeris information is latest ephemeris information.

Alternatively, the mobile terminal may generate the current ephemeris information through calculation according to ephemeris information acquired after previous GPS positioning. In this case, the ephemeris information can be acquired without performing data transmission between the mobile terminal and the network side.

It should be noted that, a sequence of the foregoing steps 201, 202, and 203 is not limited in the embodiment of the present invention.

Step 204: After the GPS positioning is started, acquire the first cell identifier of the first cell in which the mobile terminal is located.

For a specific process of this step, reference is made to the description in step 101 in the embodiment shown in FIG. 1.

Step 205: The mobile terminal acquires, according to the first cell identifier, the first latitude and longitude information corresponding to the first cell identifier from the correspondence table stored on the mobile terminal.

Latitude and longitude information corresponding to a cell identifier acquired from the correspondence table is rough latitude and longitude information corresponding to the cell identifier, and the latitude and longitude information may be used for assisting a GPS receiver of increasing a GPS positioning speed.

Step 206: With reference to the first latitude and longitude information, the time information, and the ephemeris information, perform GPS positioning on the mobile terminal by using a GPS receiver of the mobile terminal.

With reference to the first latitude and longitude information, the time information, and the ephemeris information, a speed at which the GPS receiver performs the GPS positioning may be increased.

Because the time information may be acquired before the GPS positioning is started, during the GPS positioning, the current accurate time may be obtained to serve as current time information by using previously acquired time information as a reference.

The GPS positioning speed depends on signal intensity and status of the GPS receiver before the GPS positioning. In the prior art, starting states of the GPS receiver are classified into cold start, warm start, and hot start. A GPS positioning speed after the hot start is highest, and user experience is improved most significantly.

The cold start generally refers to a starting process during which the GPS receiver is started in an unknown environment until the GPS receiver gets in contact with a surrounding satellite and obtains coordinates through calculation.

The warm start generally refers to start performed after more than 2 hours since previous GPS positioning, where satellite searching and positioning time is between the cold start and the hot start. For example, when the GPS positioning was used one day, first-time GPS start on the next day belongs to the warm start, and previous location information is displayed after the start.

The hot start generally refers to a process of starting GPS positioning when there is not much movement from a place where a GPS was closed previously and it is generally less than 2 hours since previous GPS positioning. Because a satellite that has been found and a satellite that can be actually contacted are basically the same, a speed of the hot start is the highest.

According to the embodiment of the present invention, when a GPS receiver performs GPS positioning with reference to first latitude and longitude information, time information, and ephemeris information, a hot start effect can be achieved each time the GPS positioning is performed, thereby avoiding that an AGPS positioning speed is affected when network signal quality is poor, or a data server is blocked.

In another implementation manner, the GPS positioning method for the mobile terminal according to the embodiment of the present invention may further include:

Step 207: After the GPS positioning is performed, the mobile terminal updates the latitude and longitude information corresponding to the first cell in the correspondence table with latitude and longitude information acquired in the GPS positioning.

After the GPS positioning is performed, latitude and longitude information of a location at which the mobile terminal is currently located may be obtained, and the latitude and longitude information of the first cell in which the mobile terminal is currently located may be updated with the latitude and longitude information, so accuracy of the latitude and longitude information of the first cell may be improved.

In another implementation manner, the GPS positioning method for the mobile terminal according to the embodiment of the present invention may further include:

Step c1: Acquire frequency of GPS positioning performed in each cell by the mobile terminal.

Step c2: Maintain, according to the frequency of the GPS positioning, latitude and longitude information of N cells with highest frequency in the correspondence table.

The number of pieces of latitude and longitude information maintained in the correspondence table may be limited. For example, latitude and longitude information of N cells is maintained at most in the correspondence table. Therefore, when the number of cells of which latitude and longitude information needs to be maintained in the correspondence table exceeds N, latitude and longitude information of the N cells with highest GPS positioning frequency may be selected for maintenance by using the foregoing steps c1 and c2.

It should be noted that, a sequence of the foregoing steps c1 and c2 in this method is not limited in the embodiment of the present invention. The mobile terminal may execute the foregoing steps c1 and c2 at regular intervals, or may execute the foregoing steps when the number of items maintained in the correspondence table is beyond a requirement.

According to the embodiment of the present invention, when a mobile terminal performs GPS positioning, latitude and longitude information of a cell in which the mobile terminal is currently located is acquired from a correspondence table stored on the mobile terminal, and a speed at which a GPS receiver performs the GPS positioning may be increased according to the latitude and longitude information, and time information and ephemeris information that are obtained in advance. In addition, because the latitude and longitude information, the time information, and the ephemeris information all may not need to be acquired by using a network side, times of data transmission between the mobile terminal and the network side may be reduced, and a positioning speed is increased; and an impact of network signal quality on an AGPS positioning speed is reduced.

Figure 3:
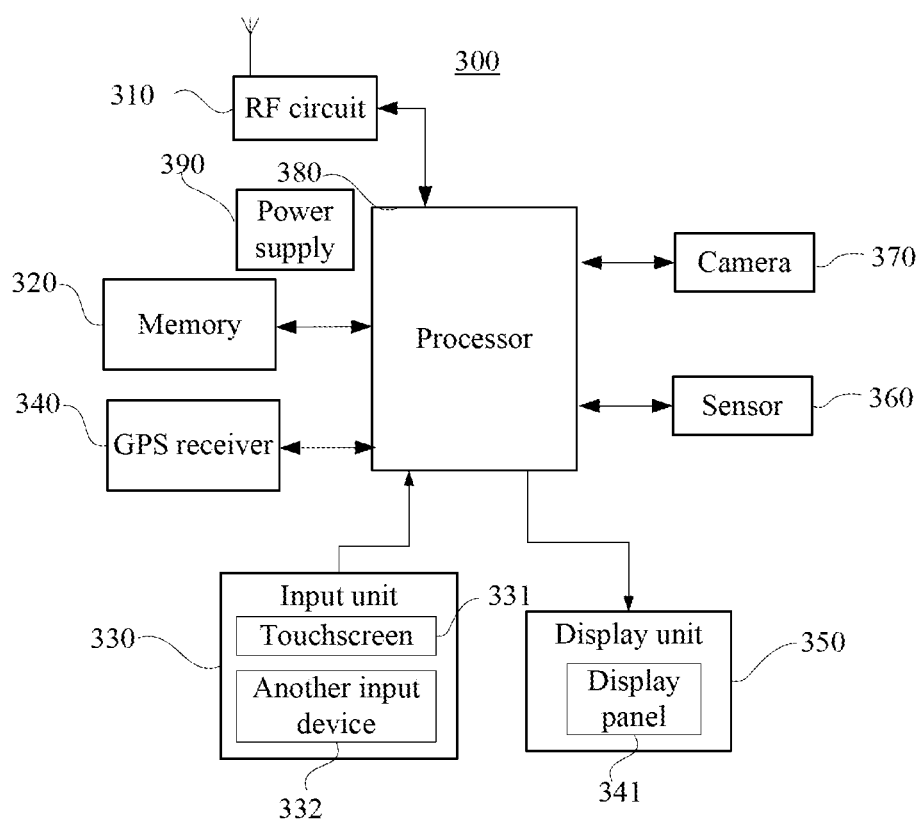
FIG. 3 is a schematic structural diagram of a mobile terminal according to an embodiment of the present invention.

FIG. 3 is a schematic structural diagram of a mobile terminal according to an embodiment of the present invention. The mobile terminal provided in the embodiment of the present invention may be configured to implement the methods implemented in the foregoing embodiments of the present invention shown in FIG. 1 and FIG. 2. For ease of description, only a part related to the embodiment of the present invention is shown. For a specific technical detail that is not disclosed, refer to the embodiments of the present invention shown in FIG. 1 and FIG. 2.

The mobile terminal may be a terminal device, such as a mobile phone, a tablet computer, a laptop, a UMPC, a netbook, a PDA, or a POS. In an example of the embodiment of the present invention, the mobile terminal is a mobile phone. FIG. 3 shows a block diagram of a part of a structure of a mobile phone 300 related to the embodiments of the present invention. As shown in FIG. 3, the mobile phone 300 includes parts, such as an RF (radio frequency) circuit 310, a memory 320, an input unit 330, a GPS receiver 340, a display unit 350, a sensor 360, a camera 370, a processor 380, and a power supply 390. A person skilled in the art can understand that the structure of the mobile phone shown in FIG. 3 does not constitute a limitation on the mobile phone, and may include more or fewer parts than those shown in the figure, or may combine some parts, or have different arrangement of the parts.

With reference to FIG. 3, the following describes in detail component parts of the mobile phone 300:

The RF circuit 310 may be configured to: receive and send information, or receive and send a signal during a call, and particularly, after receiving downlink information of a base station, send the downlink information to the processor 380 for processing; and in addition, send uplink data to the base station. Generally, the RF circuit includes but is not limited to an antenna, at least one amplifier, a transceiver, a coupler, an LNA (low noise amplifier), a duplexer, and the like. In addition, the RF circuit 310 may also communicate with a network and another device by using wireless communications. The wireless communications may use any communications standard or protocol, and includes but is not limited to GSM (global system of mobile communications), GPRS (general packet radio service), CDMA (code division multiple access), WCDMA (wideband code division multiple access), LTE (long term evolution), E-mail, SMS (short message service), and the like.

The memory 320 may be configured to store a software program, or a module, or both. The processor 380 executes function applications of the mobile phone 300 and data processing by running the software program, or the module, or both stored on the memory 320. The memory 320 may mainly include a program storage area and a data storage area. The program storage area may store an operating system, an application program required by at least one function (for example, a sound playback function and an image playback function), and the like; and the data storage area may store data (for example, audio data, image data, and a phone book) created according to use of the mobile phone 300, and the like. In addition, the memory 320 may include a high-speed random access memory, and may further include a non-volatile memory, for example, at least one disk storage device, a flash memory device, or another non-volatile solid-state storage device.

The input unit 330 may be configured to receive information about an entered number or character, and generate a key signal input related to user setting and function control of the mobile phone 300. Specifically, the input unit 330 may include a touchscreen 331 and another input device 332. The touchscreen 331, also called a touch-control panel, may collect a touch operation (for example, an operation performed by a user on the touchscreen 331 or near the touchscreen 331 by using any suitable object or accessory, such as a finger and a stylus) of a user on or near the touchscreen 331, and drive a corresponding connecting apparatus according to a preset program. Optionally, the touchscreen 331 may include two parts, namely, a touch detecting apparatus and a touch controller. The touch detecting apparatus detects a touch position of the user, detects a signal brought by the touch operation, and transfers the signal to the touch controller; and the touch controller receives touch information from the touch detecting apparatus, converts the touch information into coordinates of a touch point, sends the coordinates to the processor 380, and can receive and execute a command sent by the processor 380. In addition, the touchscreen 331 may be implemented in one of a plurality of types, such as a resistive type, a capacitive type, an infrared type, and a surface acoustic wave type. In addition to the touchscreen 331, the input unit 330 may further include the another input device 332. Specifically, the another input devices 332 may include but is not limited to one or more of the following: a physical keyboard, a functional button (for example, a volume control button, or an power on/off button), a trackball, a mouse, a joystick, and the like.

The GPS receiver 340 may be an independent GPS chip, and is configured to perform GPS positioning by communicating with a GPS satellite.

The display unit 350 may be configured to display information entered by the user or information provided to the user and menus of the mobile phone 300. The display unit 350 may include a display panel 341. Optionally, the display panel 341 may be arranged in a form, such as an LCD (Liquid Crystal Display) or an OLED (Organic Light-Emitting Diode). Further, the touchscreen 331 may cover the display panel 341; after detecting the touch operation on or near the touchscreen 331, the touchscreen 331 transfers the touch operation to the processor 380, so as to determine a type of a touch event; and then, the processor 380 provides, on the display panel 341, a corresponding vision output according to the type of the touch event. In FIG. 3, the touchscreen 331 and the display panel 341 are two independent parts for implementing input and output functions of the mobile phone 300; however, the touchscreen 331 and the display panel 341 may be integrated in some embodiments to implement the input and output functions of the mobile phone 300.

The mobile phone 300 may further include at least one sensor 360, such as a light sensor, a motion sensor, a density sensor, and another sensor. Specifically, the light sensor may include an ambient light sensor and a proximity sensor. The ambient light sensor can adjust luminance of the display panel 341 according to intensity of ambient light; and the proximity sensor can detect whether an object approaches or touches the mobile phone, and when the mobile phone 300 is moved close to an ear, the display panel 341, or backlight, or both may be turned off. As one type of the motion sensor, an accelerometer sensor may detect a magnitude of accelerations in all directions (three axes generally), may detect a magnitude and a direction of gravity when staying still, and may be configured to recognize mobile phone posture applications (such as landscape and portrait switching, related games, and magnetometer posture calibration), and vibration recognition related functions (such as a pedometer and knocking), and the like. The density sensor can detect a density of an object in contact with the mobile phone. For other sensors, such as a gyroscope, a barometer, a hygrometer, a thermometer, and an infrared sensor, that may also be arranged in the mobile phone 300, details are not repeatedly described herein.

The camera 370 is a built-in camera of the mobile phone, may be a front-facing camera, or may be a rear-facing camera.

The processor 380 is a control center of the mobile phone 300, and is connected to all parts of the entire mobile phone by using interfaces and lines, and executes various functions of the mobile phone 300 and data processing by running or executing the software program and/or module stored on the memory 320 and calling data stored on the memory 320, so as to monitor the mobile phone as a whole. Optionally, the processor 380 may include one or more processing units. Preferably, the processor 380 may be integrated with an application processor and a modem processor, where the application processor mainly processes an operating system, a user interface, an application program, and the like, and the modem processor mainly processes wireless communications. It can be understood that, the foregoing modem processor may not be integrated into the processor 380.

The mobile phone 300 further includes the power supply 390 (such as a battery) that supplies power to all the parts. Preferably, the power supply may be logically connected to the processor 380 by using a power supply management system, so that functions of charging, discharging, power consumption management, and the like are implemented by using the power supply management system.

Although not shown, an audio circuit, a WiFi (wireless fidelity) module, a Bluetooth module, and the like may also be included in the mobile phone 300, and details are not repeatedly described herein.

In the embodiment of the present invention, the RF circuit 310, the memory 320, the GPS receiver 340, and the processor 380 further have the following functions.

The RF circuit 310, the memory 320, and the GPS receiver 340 are electrically connected to the processor 380 separately.

The RF circuit 310 is configured to, after GPS positioning is started, receive a first cell identifier of a first cell in which the mobile phone 300 is located.

The processor 380 is configured to acquire, according to the first cell identifier received by the RF circuit 310, first latitude and longitude information corresponding to the first cell identifier from a correspondence table stored on the memory 320, where the correspondence table includes a cell identifier and latitude and longitude information corresponding to the cell identifier.

The GPS receiver 340 is configured to perform the GPS positioning on the mobile phone 300 with reference to the first latitude and longitude information acquired by the processor 380, and time information and ephemeris information that are acquired in advance.

The processor 380 may send the first latitude and longitude information, the time information, and the ephemeris information to the GPS receiver 340, to increase a speed at which the GPS receiver 340 performs the GPS positioning.

Further, the processor 380 is further configured to acquire, before the GPS positioning is started, the first cell identifier and the first latitude and longitude information corresponding to the first cell identifier, and add the first cell identifier and the first latitude and longitude information corresponding to the first cell identifier to the correspondence table stored on the memory 320.

Specifically, the processor 380 may acquire the first latitude and longitude information corresponding to the first cell identifier in any one of the following manners.

When the mobile phone 300 enters the first cell or when the mobile phone 300 enables a data service within the first cell, the first latitude and longitude information corresponding to the first cell identifier is received from a network side by using the RF circuit 310.

Alternatively, when the mobile phone 300 enters the first cell or when the mobile phone 300 enables a data service within the first cell, a system message is received by using the RF circuit 310, and the first latitude and longitude information corresponding to the first cell identifier is acquired from a system message.

Alternatively, during a process of performing GPS navigation by the mobile phone 300, when the mobile phone 300 passes through the first cell, the first latitude and longitude information corresponding to the first cell identifier is acquired from GPS navigation data.

Further, the processor 380 may be further configured to: after performing the GPS positioning, update the latitude and longitude information corresponding to the first cell identifier in the correspondence table with latitude and longitude information acquired in the GPS positioning.

Further, the processor 380 may be further configured to acquire the time information before the GPS positioning is started, where the time information is current time.

A process in which the processor 380 acquires the time information may include: receiving a system message by using the RF circuit 310, and acquiring the time information from the system message; or acquiring the time information from a network side by using the RF circuit 310.

Further, the processor 380 may be further configured to acquire the ephemeris information before the GPS positioning is started. A process in which the processor 380 acquires the ephemeris information may include: receiving, according to a preset time interval, current ephemeris information from a network side by using the RF circuit 310; or generating the current ephemeris information through calculation according to ephemeris information acquired after previous GPS positioning.

Further, the processor 380 may be further configured to: acquire frequency of GPS positioning performed in each cell by the mobile phone 300, where latitude and longitude information corresponding to N cells with highest frequency in the correspondence table is maintained according to the GPS positioning frequency.

According to the embodiment of the present invention, when a mobile terminal performs GPS positioning, a processor acquires latitude and longitude information corresponding to a cell in which the mobile terminal is currently located from a correspondence table stored on the mobile terminal, and a GPS receiver may increase a GPS positioning speed with reference to the latitude and longitude information, and time information and ephemeris information that are obtained in advance. In addition, because the latitude and longitude information, the time information, and the ephemeris information all may not need to be acquired by using a network side, times of data transmission between the mobile terminal and the network side may be reduced, and a positioning speed is increased; and an impact of network signal quality on an AGPS positioning speed may be reduced by using the embodiment of the present invention on a basis of an AGPS positioning technology.

Figure 4:
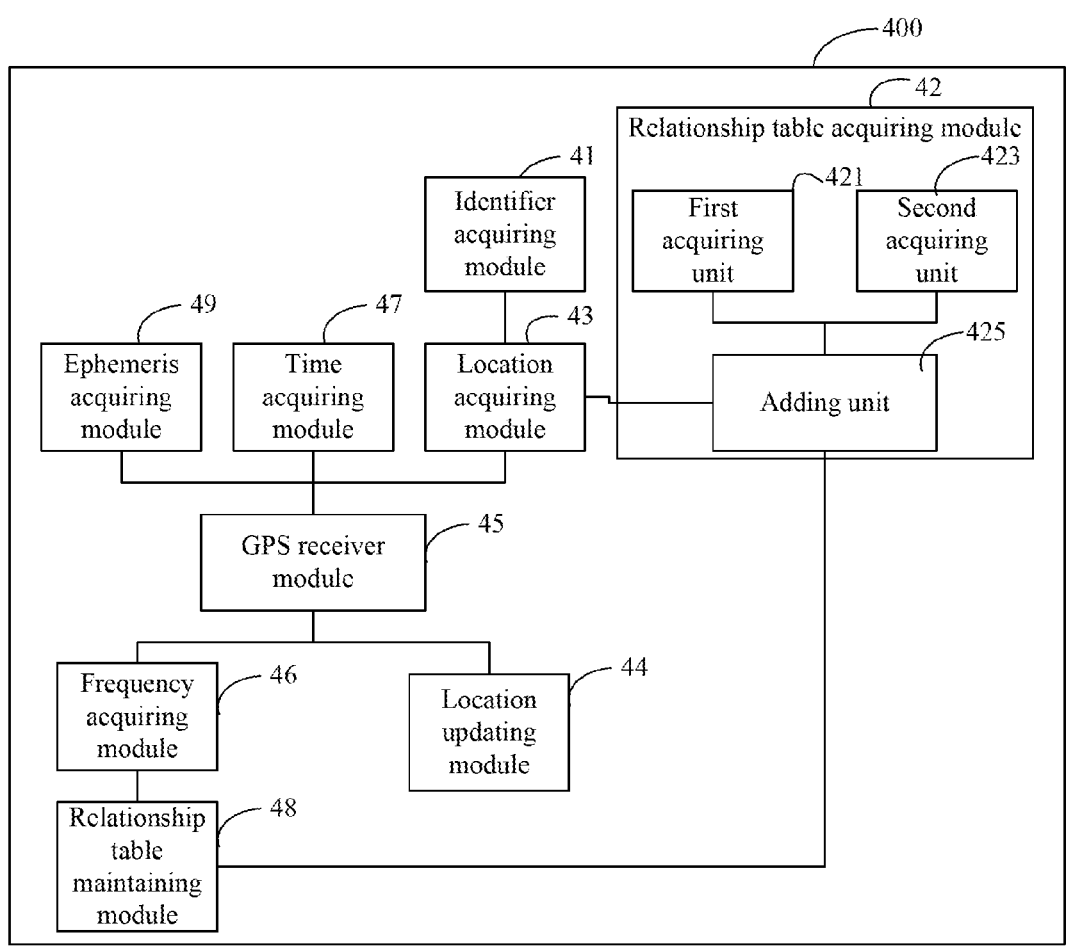
FIG. 4 is a schematic structural diagram of a mobile terminal according to an embodiment of the present invention.

FIG. 4 is a schematic structural diagram of another mobile terminal according to an embodiment of the present invention. A mobile terminal 400 provided in the embodiment of the present invention may be configured to implement the methods implemented in the foregoing embodiments of the present invention shown in FIG. 1 and FIG. 2. As shown in FIG. 4, the mobile terminal 400 includes an identifier acquiring module 41, a location acquiring module 43, and a GPS receiver module 45.

The identifier acquiring module 41 is configured to acquire, after GPS positioning is started, a first cell identifier of a first cell in which the mobile terminal is located.

The location acquiring module 43 is configured to acquire, according to the first cell identifier acquired by the identifier acquiring module 41, first latitude and longitude information corresponding to the first cell identifier from a correspondence table stored on the mobile terminal, where the correspondence table includes a cell identifier and latitude and longitude information corresponding to the cell identifier.

The GPS receiver module 45 is configured to perform GPS positioning on the mobile terminal with reference to the first latitude and longitude information acquired by the location acquiring module 43, and time information and ephemeris information that are acquired in advance.

Further, in another implementation manner, the mobile terminal 400 may further include: a time acquiring module 47.

The time acquiring module 47 is configured to: acquire the time information before the GPS positioning is started, where the time information is current time.

The time acquiring module 47 may be specifically configured to: acquire the time information from a system message before the GPS positioning is started; or acquire the time information from a network side before the GPS positioning is started.

Further, in another implementation manner, the mobile terminal 400 may further include: an ephemeris acquiring module 49.

The ephemeris acquiring module 49 is configured to: acquire the ephemeris information before the GPS positioning is started.

The ephemeris acquiring module 49 may be specifically configured to: before the GPS positioning is started, acquire current ephemeris information from a network side according to a preset time interval; or before the GPS positioning is started, generate current ephemeris information through calculation according to ephemeris information acquired after previous GPS positioning.

Further, in another implementation manner, the mobile terminal 400 may further include: a relationship table acquiring module 42.

The relationship table acquiring module 42 is configured to: before the GPS positioning is started, acquire the first cell identifier and the first latitude and longitude information corresponding to the first cell identifier, and add the first cell identifier and the first latitude and longitude information corresponding to the first cell identifier to the correspondence table.

The relationship table acquiring module 42 includes: a first acquiring unit 421, a second acquiring unit 423, and an adding unit 425.

The first acquiring unit 421 is configured to acquire the first cell identifier.

The second acquiring unit 423 is configured to: when the mobile terminal enters the first cell or when the mobile terminal enables a data service within the first cell, acquire the first latitude and longitude information corresponding to the first cell identifier from a network side; and/or is configured to: when the mobile terminal enters the first cell or when the mobile terminal enables a data service within the first cell, acquire the first latitude and longitude information corresponding to the first cell identifier from a system message; and/or is configured to: during a process of performing GPS navigation by the mobile terminal, when the mobile terminal passes through the first cell, acquire the first latitude and longitude information corresponding to the first cell identifier from GPS navigation data.

The adding unit 425 is configured to add the first cell identifier acquired by the first acquiring unit 421 and the first latitude and longitude information acquired by the second acquiring unit 423 to the correspondence table.

Further, in another implementation manner, the mobile terminal 400 may further include: a location updating module 44, a frequency acquiring module 46, and a relationship table maintaining module 48.

The location updating module 44 is configured to: after the GPS positioning is performed, update the first latitude and longitude information corresponding to the first cell identifier in the correspondence table with latitude and longitude information acquired in the GPS positioning.

The frequency acquiring module 46 is configured to acquire frequency of GPS positioning performed in each cell by the mobile terminal.

The relationship table maintaining module 48 is configured to maintain, according to the frequency of the GPS positioning acquired by the frequency acquiring module 46, latitude and longitude information corresponding to N cells with highest frequency in the correspondence table.

According to the embodiment of the present invention, when a mobile terminal performs GPS positioning, a location acquiring module acquires latitude and longitude information corresponding to a cell in which the mobile terminal is currently located from a correspondence table stored on the mobile terminal, and a GPS receiver may increase a GPS positioning speed with reference to the latitude and longitude information, and time information and ephemeris information that are obtained in advance. In addition, because the latitude and longitude information, the time information, and the ephemeris information all may not need to be acquired by using a network side, times of data transmission between the mobile terminal and the network side may be reduced, and a positioning speed is increased; and an impact of network signal quality on an AGPS positioning speed may be reduced by using the embodiment of the present invention on a basis of an AGPS positioning technology.

According to descriptions of the foregoing implementation manners, a person skilled in the art can clearly understand that the present invention may be implemented by hardware, firmware, or a combination of the two. When the present invention is implemented by software, the functions may be stored in a computer-readable medium or may be transmitted as one or more instructions or code on the computer-readable medium. The computer-readable medium includes a computer storage medium and a communications medium, where the communications medium includes any medium that facilitates transfer of computer programs from one place to another. The storage medium may be any available medium that is accessible by a computer. For example, but it is not limited to that, the computer readable medium may include a RAM, a ROM, an EEPROM, a CD-ROM, or other optical disc storage or magnetic disk storage medium or other magnetic storage device, or any other medium that can be configured to carry or store expected program code in a structural form of an instruction or data and can be accessed by a computer. Moreover, any connection may be the computer readable medium properly. For example, if the software is transmitted from a website, a server or another remote source by using a coaxial cable, an optical fiber cable, a twisted wire, a digital subscriber line (DSL), or a wireless technology such as infrared, radio and microwave, the coaxial cable, the optical fiber cable, the twisted wire, the DSL, or the wireless technology such as infrared, radio and microwave are included in the definition of the medium. A disk and a disc used in the present invention include a compact disc (CD), a laser disc, an optical disc, a digital versatile disc (DVD), a floppy disk, and a blue light disc, where the disk generally copies data magnetically, and the disc copies data optically by using laser. Combinations of them shall also fall within the protection scope of the computer-readable medium.

To sum up, the foregoing descriptions are merely exemplary embodiments of the present invention, but are not intended to limit the protection scope of the present invention. Any modification, equivalent replacement, and improvement made without departing from the spirit and principle of the present invention shall fall within the protection scope of the present invention.

What is claimed is:

1. A global positioning system (GPS) positioning method for a mobile terminal, the method comprising:
   acquiring, by the mobile terminal, an ephemeris information before GPS positioning is started;
   acquiring, by the mobile terminal, a first cell identifier of a first cell in which the mobile terminal is located;
   after GPS positioning is started, acquiring by the mobile terminal, according to the first cell identifier, a first latitude and longitude information corresponding to the first cell identifier from a correspondence table, wherein the correspondence table comprises a cell identifier and a latitude and longitude information corresponding to the cell identifier; and
   using the first latitude and longitude information, the ephemeris information, along with a time information that is acquired in advance, performing, by the mobile terminal, the GPS positioning by using a GPS receiver of the mobile terminal.

2. The method according to claim 1, wherein the method further comprises:
   acquiring, by the mobile terminal, the time information from a system message before the GPS positioning is started, wherein the time information is current time.

3. The method according to claim 1, wherein the method further comprises:
   acquiring, by the mobile terminal, the time information from a network side before the GPS positioning is started, wherein the time information is current time.

4. The method according to claim 1, wherein acquiring, by the mobile terminal, the ephemeris information before GPS positioning is started comprises:
   acquiring, by the mobile terminal, the ephemeris information from a network side according to a preset time interval before GPS positioning is started.

5. The method according to claim 1, wherein acquiring, by the mobile terminal, the ephemeris information before GPS positioning is started comprises:
   before the GPS positioning is started, generating, by the mobile terminal, the ephemeris information through calculation according to ephemeris information acquired after previous GPS positioning.

6. The method according to claim 1, wherein the method further comprises:
   before the GPS positioning is started, acquiring, by the mobile terminal, the first cell identifier and the first latitude and longitude information corresponding to the first cell identifier, and adding the first cell identifier and the first latitude and longitude information corresponding to the first cell identifier to the correspondence table, wherein the acquiring the first latitude and longitude information corresponding to the first cell identifier comprises:
   when the mobile terminal enters the first cell or when the mobile terminal enables a data service within the first cell, acquiring, by the mobile terminal, the first latitude and longitude information corresponding to the first cell identifier from a network side.

7. The method according to claim 1, wherein the method further comprises:
   before the GPS positioning is started, acquiring, by the mobile terminal, the first cell identifier and the first latitude and longitude information corresponding to the first cell identifier, and adding the first cell identifier and the first latitude and longitude information corresponding to the first cell identifier to the correspondence table, wherein the acquiring the first latitude and longitude information corresponding to the first cell identifier comprises:
when the mobile terminal enters the first cell or when the mobile terminal enables a data service within the first cell, acquiring, by the mobile terminal, the first latitude and longitude information corresponding to the first cell identifier from a system message.

8. The method according to claim 1, wherein the method further comprises:
before the GPS positioning is started, acquiring, by the mobile terminal, the first cell identifier and the first latitude and longitude information corresponding to the first cell identifier, and adding the first cell identifier and the first latitude and longitude information corresponding to the first cell identifier to the correspondence table, wherein the acquiring the first latitude and longitude information corresponding to the first cell identifier comprises:
when the mobile terminal passes through the first cell during a process of performing GPS navigation by the mobile terminal, acquiring, by the mobile terminal, the first latitude and longitude information corresponding to the first cell identifier from GPS navigation data.

9. The method according to claim 1, wherein the method further comprises:
after the GPS positioning is performed, updating, by the mobile terminal, the first latitude and longitude information corresponding to the first cell identifier in the correspondence table with latitude and longitude information acquired in the GPS positioning.

10. The method according to claim 1, wherein the method further comprises:
acquiring, by the mobile terminal, frequency of GPS positioning performed in each cell; and
maintaining by the mobile terminal, according to the frequency of the GPS positioning, latitude and longitude information of N cells with highest frequency in the correspondence table.

11. A mobile terminal comprising:
a memory;
a GPS receiver; and
a processor coupled to the memory and the GPS receiver, wherein the memory is configured to store program codes which, when executed by the processor, cause the processor to:
acquire an ephemeris information before GPS positioning is started;
acquire a first cell identifier of a first cell in which the mobile terminal is located;
after GPS positioning is started, acquire, according to the first cell identifier, a first latitude and longitude information corresponding to the first cell identifier from a correspondence table, wherein the correspondence table comprises a cell identifier and a latitude and longitude information corresponding to the cell identifier; and
perform the GPS positioning with reference to the first latitude and longitude information, the ephemeris information, and time information that is acquired in advance.

12. The mobile terminal according to claim 11, wherein the program codes further cause the processor to:
acquire the time information from a system message before the GPS positioning is started, wherein the time information is current time.

13. The mobile terminal according to claim 11, wherein the program codes further cause the processor to:
acquire the time information from a network side before the GPS positioning is started, wherein the time information is current time.

14. The mobile terminal according to claim 11, wherein the ephemeris information is acquired by the processor from a network side according to a preset time interval.

15. The mobile terminal according to claim 11, wherein the ephemeris information is generated through calculation according to ephemeris information acquired after previous GPS positioning.

16. The mobile terminal according to claim 11, wherein the program codes further cause the processor to:
before the GPS positioning is started, acquire the first cell identifier and the first latitude and longitude information corresponding to the first cell identifier, and add the first cell identifier and the first latitude and longitude information corresponding to the first cell identifier to the correspondence table,
wherein the first latitude and longitude information corresponding to the first cell identifier are acquired from a network side when the mobile terminal enters the first cell or when the mobile terminal enables a data service within the first cell.

17. The mobile terminal according to claim 11, wherein the program codes further cause the processor to:
before the GPS positioning is started, acquire the first cell identifier and the first latitude and longitude information corresponding to the first cell identifier, and add the first cell identifier and the first latitude and longitude information corresponding to the first cell identifier to the correspondence table,
wherein the first latitude and longitude information corresponding to the first cell identifier are acquired from a system message when the mobile terminal enters the first cell or when the mobile terminal enables a data service within the first cell.

18. The mobile terminal according to claim 11, wherein the program codes further cause the processor to:
before the GPS positioning is started, acquire the first cell identifier and the first latitude and longitude information corresponding to the first cell identifier, and add the first cell identifier and the first latitude and longitude information corresponding to the first cell identifier to the correspondence table,
wherein during a process of performing GPS navigation by the mobile terminal, the first latitude and longitude information corresponding to the first cell identifier are acquired from GPS navigation data when the mobile terminal passes through the first cell.

19. The mobile terminal according to claim 11, wherein the program codes further cause the processor to: after the GPS positioning is performed, update the first latitude and longitude information corresponding to the first cell identifier in the correspondence table with latitude and longitude information acquired in the GPS positioning.

20. The mobile terminal according to claim 11, wherein the program codes further cause the processor to:
acquire frequency of GPS positioning performed in each cell by the mobile terminal; and
maintain, according to the frequency of the GPS positioning, a latitude and longitude information corresponding to N cells with highest frequency in the correspondence table.

* * * * *